(12) United States Patent
Marinov et al.

(10) Patent No.: US 9,692,502 B2
(45) Date of Patent: *Jun. 27, 2017

(54) SYSTEM FOR DUAL FREQUENCY RANGE MOBILE TWO-WAY SATELLITE COMMUNICATIONS

(71) Applicant: Gilat Satellite Networks Ltd., Petah Tikva (IL)

(72) Inventors: Borislav Petkov Marinov, Sofia (BG); Ivan Tsonev Ivanov, Sofia (BG); Ivaylo Georgiev Slavkov, Sofia (BG); Ilian Kirilov Stoyanov, Sofia (BG); Daniel Mitkov Nikolov, Veliko Tarnovo (BG)

(73) Assignee: Gilat Satellite Networks Ltd., Petah Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,010

(22) Filed: Jun. 6, 2016

(65) Prior Publication Data

US 2016/0301462 A1  Oct. 13, 2016

Related U.S. Application Data

(63) Continuation of application No. 14/323,357, filed on Jul. 3, 2014, now Pat. No. 9,391,692.

(60) Provisional application No. 61/843,216, filed on Jul. 5, 2013.

(51) Int. Cl.
*H04M 1/00* (2006.01)
*H04B 7/185* (2006.01)
*H04B 1/00* (2006.01)
*H04B 7/26* (2006.01)
*H01Q 3/08* (2006.01)
*H01Q 21/30* (2006.01)

(52) U.S. Cl.
CPC .......... *H04B 7/18515* (2013.01); *H01Q 3/08* (2013.01); *H01Q 21/30* (2013.01); *H04B 1/0064* (2013.01); *H04B 7/18517* (2013.01); *H04B 7/2693* (2013.01)

(58) Field of Classification Search
CPC  H04B 7/18515; H04B 1/0064; H04B 7/2693; H04B 7/18517; H01Q 3/08; H01Q 21/30
USPC ..................... 455/562.1, 193.1; 343/757, 761
See application file for complete search history.

(56) References Cited

U.S. PATENT DOCUMENTS

| | | | | |
|---|---|---|---|---|
| 5,303,410 | A * | 4/1994 | Horigome | H03J 3/12 455/155.1 |
| 5,448,245 | A * | 9/1995 | Takase | G01S 7/292 342/160 |
| 5,617,317 | A * | 4/1997 | Ignagni | G01C 21/165 342/357.31 |
| 6,784,831 | B1 * | 8/2004 | Wang | G01S 19/21 342/357.63 |
| 2002/0023020 | A1 * | 2/2002 | Kenyon | G06Q 30/02 704/231 |
| 2004/0252067 | A1 * | 12/2004 | Royalty | H01Q 3/08 343/757 |

(Continued)

*Primary Examiner* — Dominic Rego
(74) *Attorney, Agent, or Firm* — Banner & Witcoff, Ltd.

(57) ABSTRACT

A microwave antenna terminal for two-way, in-motion communication systems using geostationary or other orbit satellites, and capable of supporting two-way communication in two different frequency ranges, for example Ku and Ka frequency ranges, is provided.

20 Claims, 15 Drawing Sheets

(56) References Cited

U.S. PATENT DOCUMENTS

| | | | |
|---|---|---|---|
| 2005/0184192 A1* | 8/2005 | Schneider | G01S 5/0247 244/3.1 |
| 2006/0273965 A1* | 12/2006 | Gat | H01Q 1/3233 343/711 |
| 2006/0284775 A1* | 12/2006 | Kaplan | H01Q 1/3275 343/713 |
| 2008/0158078 A1* | 7/2008 | Allen | H01Q 1/084 343/757 |
| 2009/0066593 A1* | 3/2009 | Jared | H01Q 1/1214 343/713 |
| 2010/0109949 A1* | 5/2010 | Garmonov | G01S 19/47 701/472 |
| 2010/0231448 A1* | 9/2010 | Harper | G01S 19/06 342/357.67 |
| 2011/0025559 A1* | 2/2011 | Chansarkar | G01S 19/258 342/357.73 |
| 2012/0299936 A1* | 11/2012 | Ashjaee | G01C 15/00 345/501 |
| 2013/0139153 A1* | 5/2013 | Shah | G06F 9/45558 718/1 |
| 2013/0343547 A1* | 12/2013 | Pahuja | H04H 40/36 381/2 |
| 2014/0005928 A1* | 1/2014 | Giannetta | G01S 19/49 701/431 |

* cited by examiner

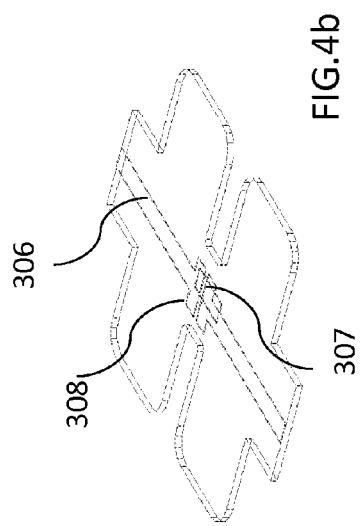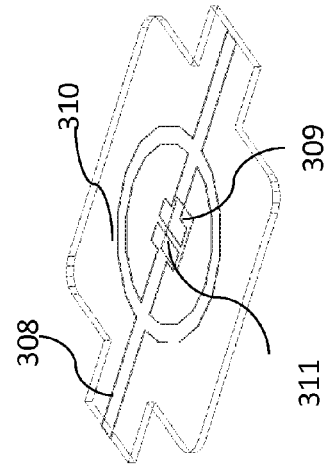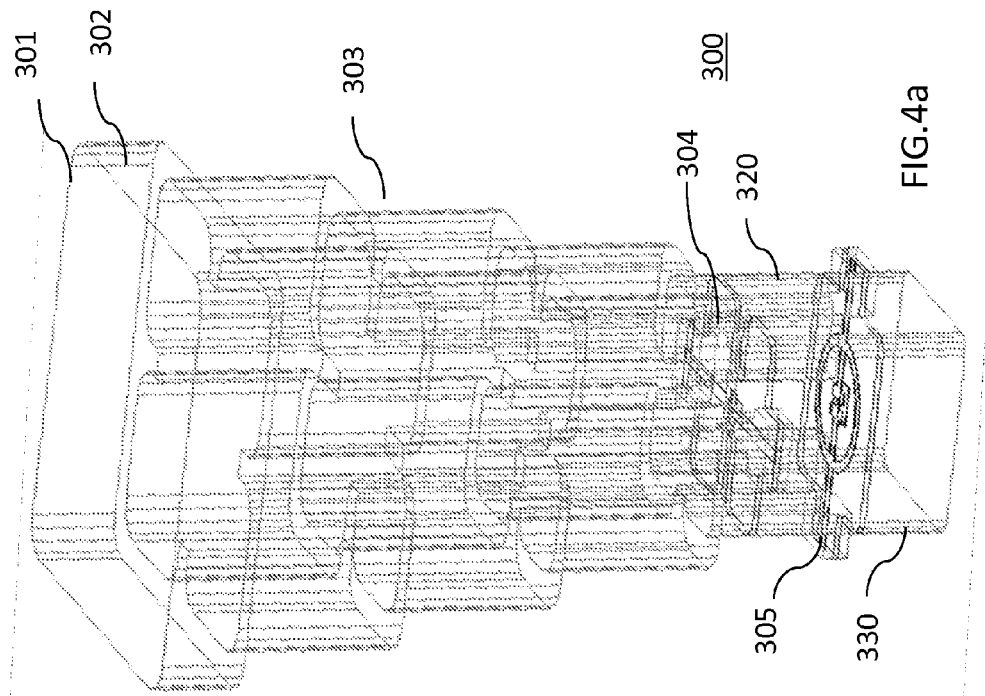

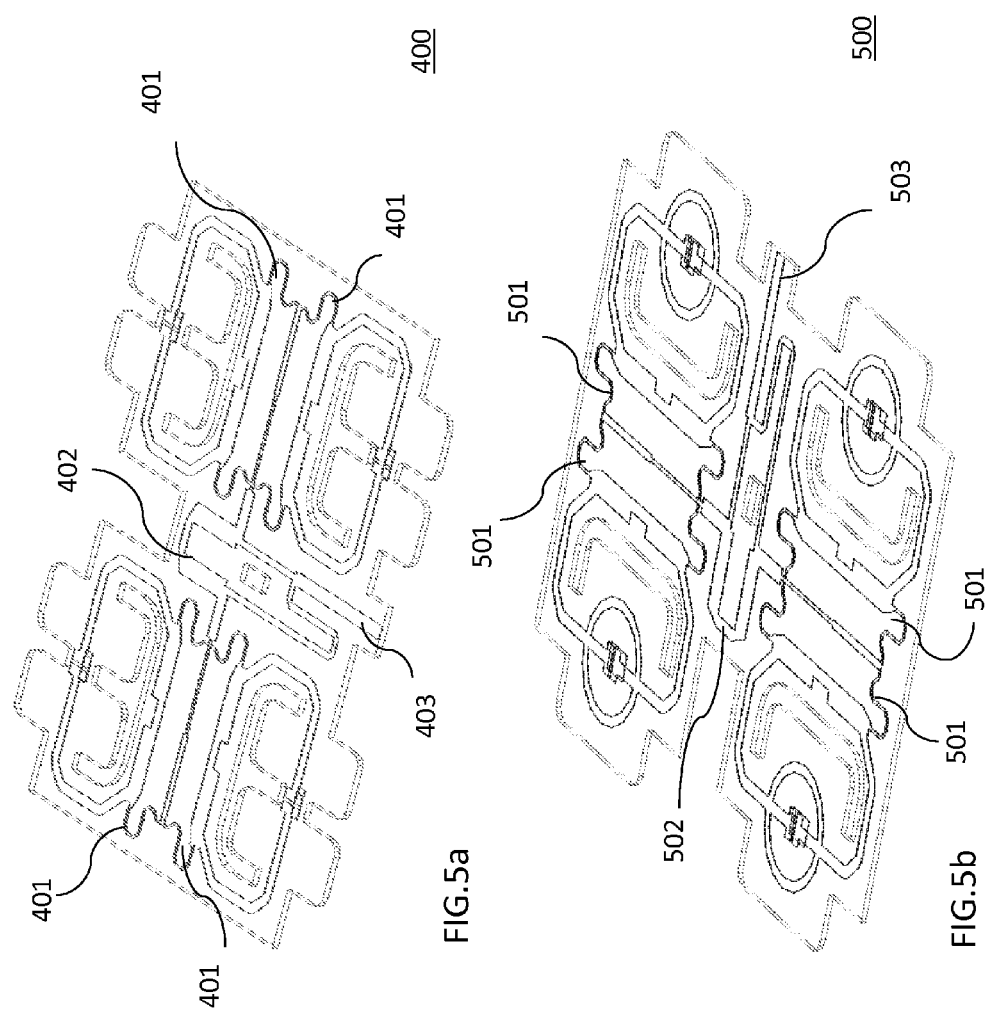

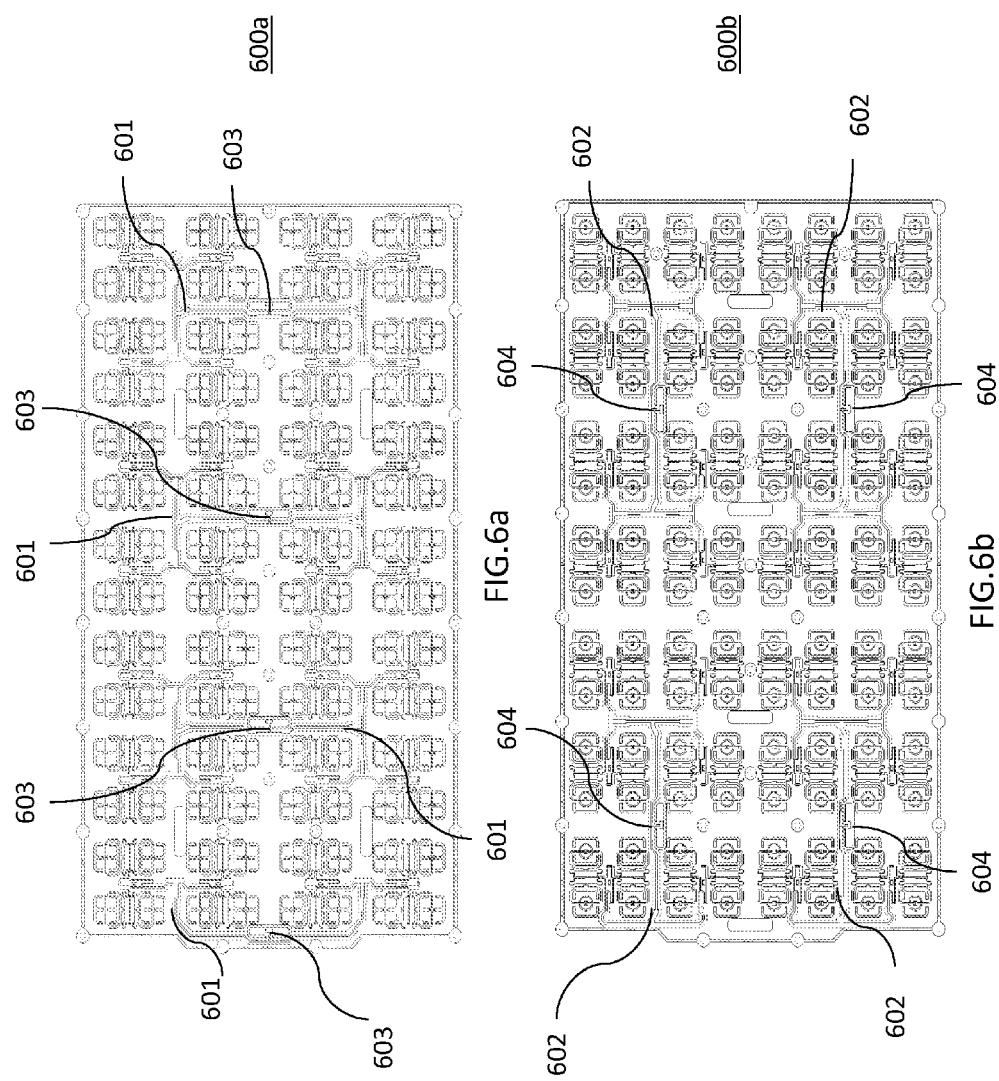

SYSTEM FOR DUAL FREQUENCY RANGE MOBILE TWO-WAY SATELLITE COMMUNICATIONS

PRIORITY CLAIM

This application is a continuation of U.S. application Ser. No. 14/323,357 filed Jul. 3, 2014, and claims priority to U.S. Provisional Patent Application Ser. No. 61/843,216, filed Jul. 5, 2013, and entitled "SYSTEM FOR DUAL FREQUENCY RANGE MOBILE TWO-WAY SATELLITE COMMUNICATIONS," the disclosures of which are incorporated by reference herein in their entirety and made part hereof.

BACKGROUND

Systems and technologies existing in the art include different types of antenna terminals based on reflector antennas or antenna array panels such as VSAT two-way fixed-service terminals, transportable VSAT systems and low-profile in-motion receive-only or two-way systems, based on planar-array antenna technology. Antenna array technology has a decisive advantage in mobile systems allowing achievement of a low-profile antenna terminal, which may be applicable to small, land-based vehicles and may support different types of broadband services, such as live TV reception, Internet, and high-speed data communications. For example, such a mobile system is disclosed in U.S. Pat. No. 7,379,707 to DiFonzo et al., entitled "System for concurrent mobile two-way data communication and TV reception," which describes a mobile terminal system that supports a combination of concurrent two-way data communication and television reception capabilities for commercial, recreational and other activities. One disadvantage of available technologies is their inability to support mobile services in different frequency ranges using one common terminal.

The drastically increased need of higher speed broadband communications has prompted the expansion of traditionally used frequency ranges (C and Ku) to include higher frequencies, for example, such as Ka frequency range (19-30 GHz) in addition to the traditionally used Ku range (10.9-14.5 GHz). In order to satisfy demand, a large fleet of geostationary high communication capacity Ka frequency range satellites was launched recently. These satellites are capable of supporting a wide range of communication services including broadband Internet connectivity for fixed and mobile users.

SUMMARY

The present disclosure concerns a microwave antenna terminal applicable to two-way, in-motion communication systems using geostationary or other orbit satellites, and capable of supporting two-way communication in two different frequency ranges. For example, Ku and Ka frequency ranges.

In accordance with aspects of the disclosure, a low-profile, mobile, in-motion antenna and transmit/receive terminal system for two-way communication, capable of supporting services in two different frequency ranges provided by satellites on different orbital positions is provided. Satellites may provide services in Ku and Ka band frequency ranges but under certain circumstances only one frequency range may be operative at a time.

In accordance with one or more aspects, frequency ranges and satellite positions may be switched and/or adjusted in a fast and fully automated manner. In some embodiments, components ensuring operation in the different frequency ranges are initially preinstalled and no human interaction may be needed during the process of switching and/or adjusting ranges and/or positions.

In some embodiments, polarization control capabilities for different frequency ranges are provided. For example, switching between circular polarizations and precise tuning of linear polarization may be performed in a fully automated manner, depending on the terminal and satellite position, as well as the current value of the mobile platform tilt angle.

In some embodiments, one or more required satellites may be tracked using an advanced navigation system. In some embodiments, such an advanced navigation system may include three-axis gyros and/or accelerometers, a temperature sensor (e.g., for temperature drift errors), and/or a differential GPS receiver.

In some embodiments, the tracking system may include a digital tracking receiver integrated into the outdoor unit, which may provide fast and accurate signal strength feedback without need for feedback from the indoor receiver for reacquisition.

In some embodiments, a dual-range, optimized radome and highly integrated indoor unit may provide biasing and control to electronic blocks integrated into the outdoor unit, and may ensure accurate and reliable system operation.

In some embodiments, the system may be optimized for specific power amplifiers, for example, a block up converter may be shaped to ensure minimal footprint and/or a compact outlook.

This summary is not intended to identify critical or essential features of the disclosure, but merely to summarize certain features and variations thereof. Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which:

FIG. 4a depicts an illustrative configuration of a dual-port array antenna element of a Ku frequency range operative panel in accordance with one or more aspects of the disclosure;

FIG. 4b depicts an illustrative configuration of horizontal-polarization differential-feed probes in accordance with one or more aspects of the disclosure;

FIG. 4c depicts an illustrative configuration of vertical-polarization differential-feed probes in accordance with one or more aspects of the disclosure;

FIG. 5a depicts an illustrative four-to-one suspended strip line combining circuit for horizontal-polarization port combining in accordance with one or more aspects of the disclosure;

FIG. 5b depicts an illustrative four-to-one suspended strip line combining circuit for vertical-polarization port combining in accordance with one or more aspects of the disclosure;

FIG. 6a depicts an illustrative configuration of a horizontal-port suspended strip line combining circuit in accordance with one or more aspects of the disclosure;

FIG. 6b depicts an illustrative configuration of a vertical-port suspended strip line combining circuit in accordance with one or more aspects of the disclosure;

DETAILED DESCRIPTION

Figure 1:
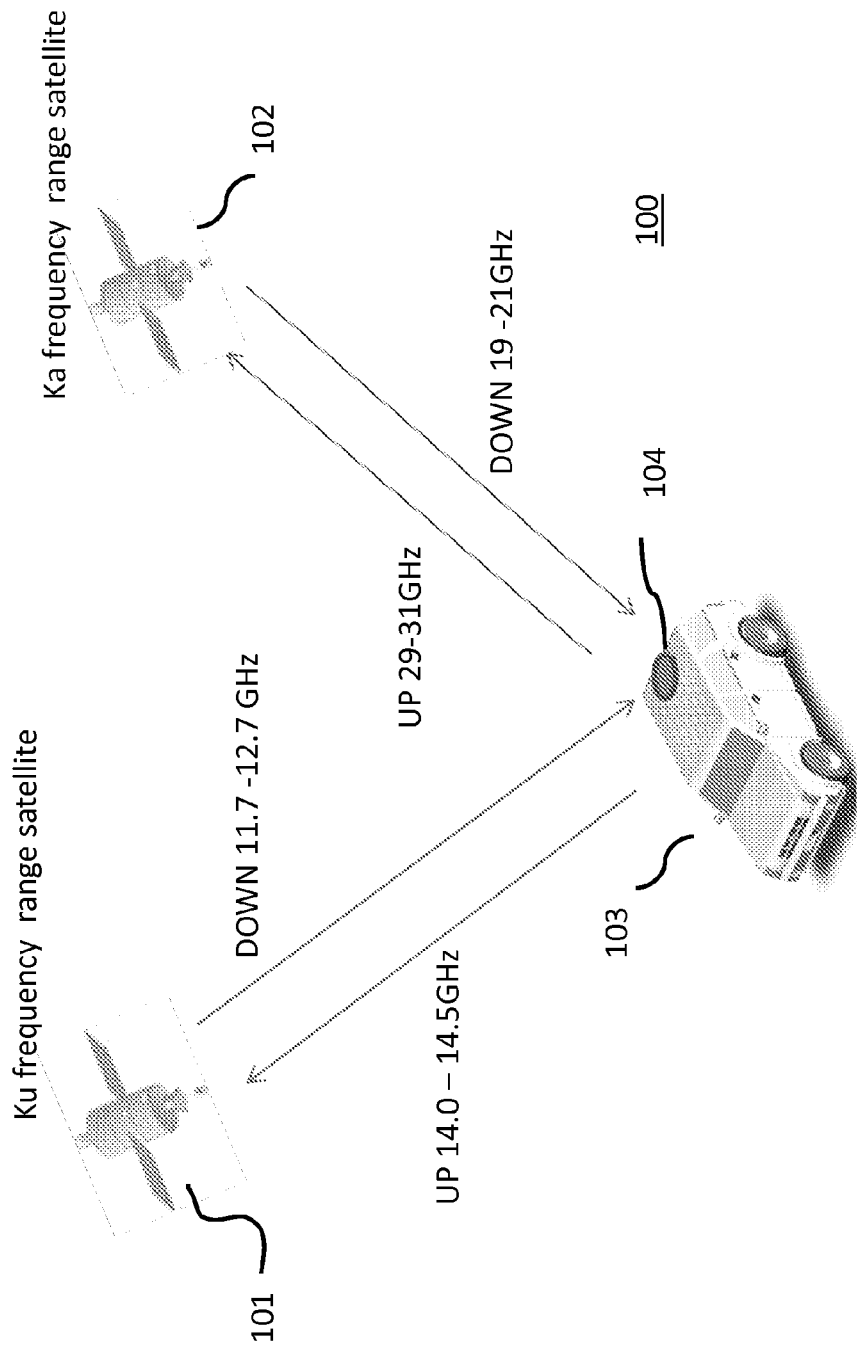
FIG. 1 depicts an illustrative communication system in accordance with one or more aspects of the disclosure.

In accordance with one or more aspects, a terminal system using a low-profile antenna that is suitable for use with a variety of vehicles, for in-motion satellite communications in support of broadband data transfer in at least two different frequency ranges and from satellites located in at least two different orbital positions is provided. In some embodiments, the different frequency ranges may be Ku and Ka ranges. With reference to FIG. 1, exemplary system environment 100 may include mobile vehicle 103 which may have low profile antenna terminal system 104 mounted thereon. Low profile antenna terminal system 104 may be adapted to communicate with at least two satellites, for example, satellites 101 and 102. At a given time, communications with only one of the mentioned satellites may be operative. In some embodiments, another exemplary embodiment antenna system may operate with a satellite, comprising transponders, operative either in Ku and Ka frequency ranges or with satellites operative in Ku and Ka frequency ranges located at the same orbital position. In some embodiments, satellite 101 may be allocated on the geostationary orbit, may be operative in Ku frequency range, and may provide FSS (Fixed Satellite Service) in a frequency band assigned by an appropriate body, such as the Federal Communication Commission (FCC) in the U.S. or similar agency in other world regions. This frequency band may be 14.0 to 14.5 GHz for the UPLINK and 11.7 to 12.7 GHz for the DOWNLINK. Satellite 102 may be allocated in another position on the geostationary orbit, may be operative in Ka frequency range, and may support broadband two-way service. The operative frequency bands in Ka frequency range may be 29 to 31 GHz for the UPLINK and 19 to 21 GHz for the DOWNLINK. Switching between these two satellites, operative in different frequency ranges, may be done automatically by low-profile antenna terminal 104. Equipment for switching between satellite positions and frequency ranges may be pre-installed initially within the terminal outdoor unit, with no need for subsequent human interaction.

Figure 2:
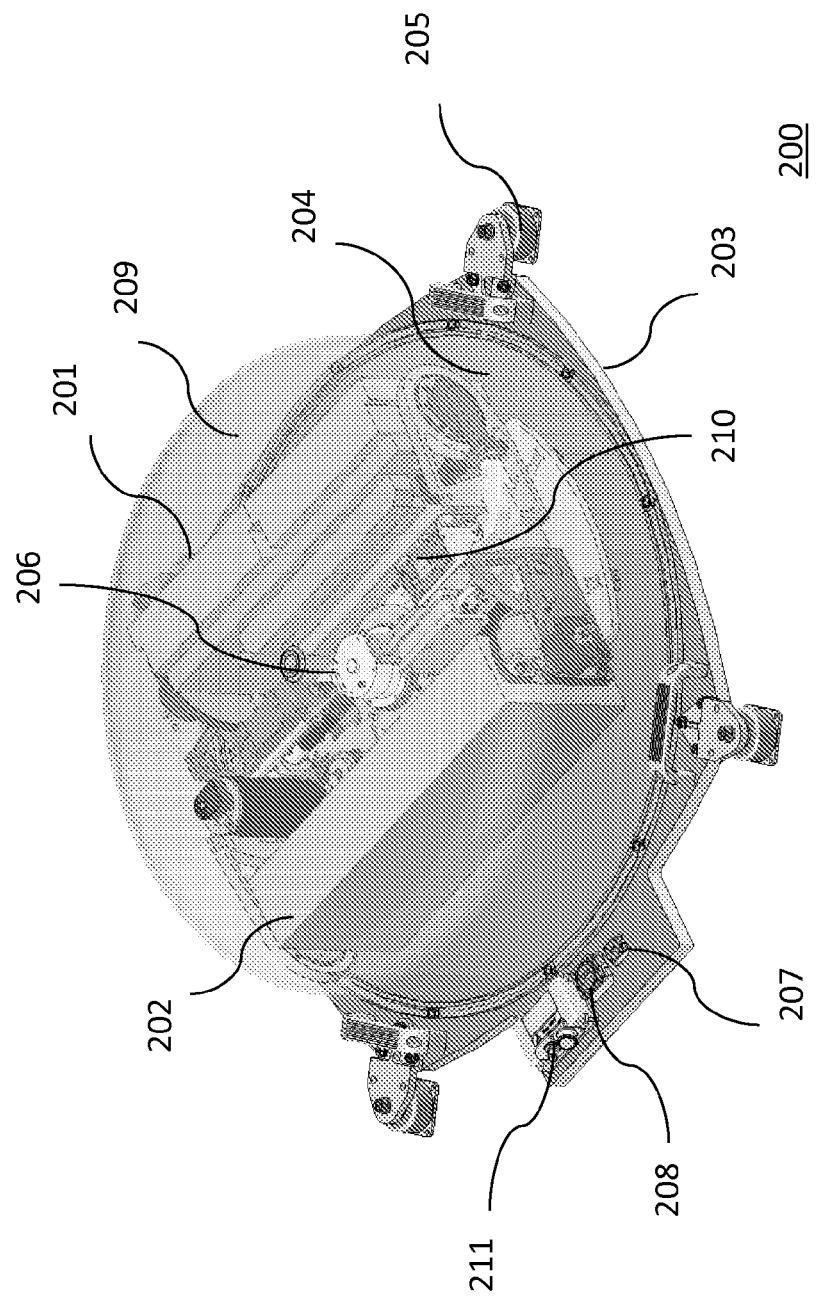
FIG. 2 depicts an illustrative construction in accordance with one or more aspects of the disclosure.

FIG. 2 depicts an illustrative construction of an outdoor unit in accordance with one or more aspects of the disclosure. Outdoor unit 200 may comprise at least two separate antennas, for example, antennas 202 and 201, which may be operative in at least two different frequency ranges. These two antennas may be antenna arrays arranged as flat panels in order to ensure a low profile of outdoor unit 200. The low-profile antennas may be preferable for mobile systems, for example, in order to support mounting on small land based vehicles. Another advantage of low-profile antennas is their ability to be flush mounted on a vehicle's roof, for example, to maintain vehicle mobility, agility, stability, and/or aerodynamics, and/or avoiding marking the equipped vehicle as a high-value target for enemy attack (e.g., in the context of military applications).

As illustrated in FIG. 2, in some embodiments, antenna panels 201 and 202 may be mounted back-to-back onto a rotating platform 204, and may be rotated in azimuth and elevation in order to point an antenna beam to a particular satellite. One of the panels, for example panel 201, may be operative in transmit/receive mode in Ku frequency rage, while another, for example panel 202, may be operative in transmit/receive mode in Ka frequency range. In some embodiments, panel 201 and/or panel 202 may be made of at least one or more plastic materials, and/or may comprise a conductive coating. The antenna terminal may be mounted on stationary base plate 203, which may be attached to the vehicle using mounting dampers 205. In some embodiments, a block up converter operative in transmit mode may be mounted below base plate 203 and connected by waveguide inputs 207 and 208. In some embodiments, waveguide inputs 207 and 208 may be operative in Ku and Ka frequency ranges. For example input 208 may be operative in Ku frequency range, while input 207 may be operative in Ka frequency range. Microwave signals may be transferred to rotating platform 204 using waveguide rotary joint 206. In some embodiments, the antenna terminal may comprise a satellite-recognition and tracking system for finding and/or tracking a desired satellite. This system may comprise one or more gyroscopic sensors, a tilt sensor, an integrated digital signal receiver, and/or GPS receiver 210, any of which may be controlled by a central CPU (Central Processing Unit) with embedded software.

Figure 3:
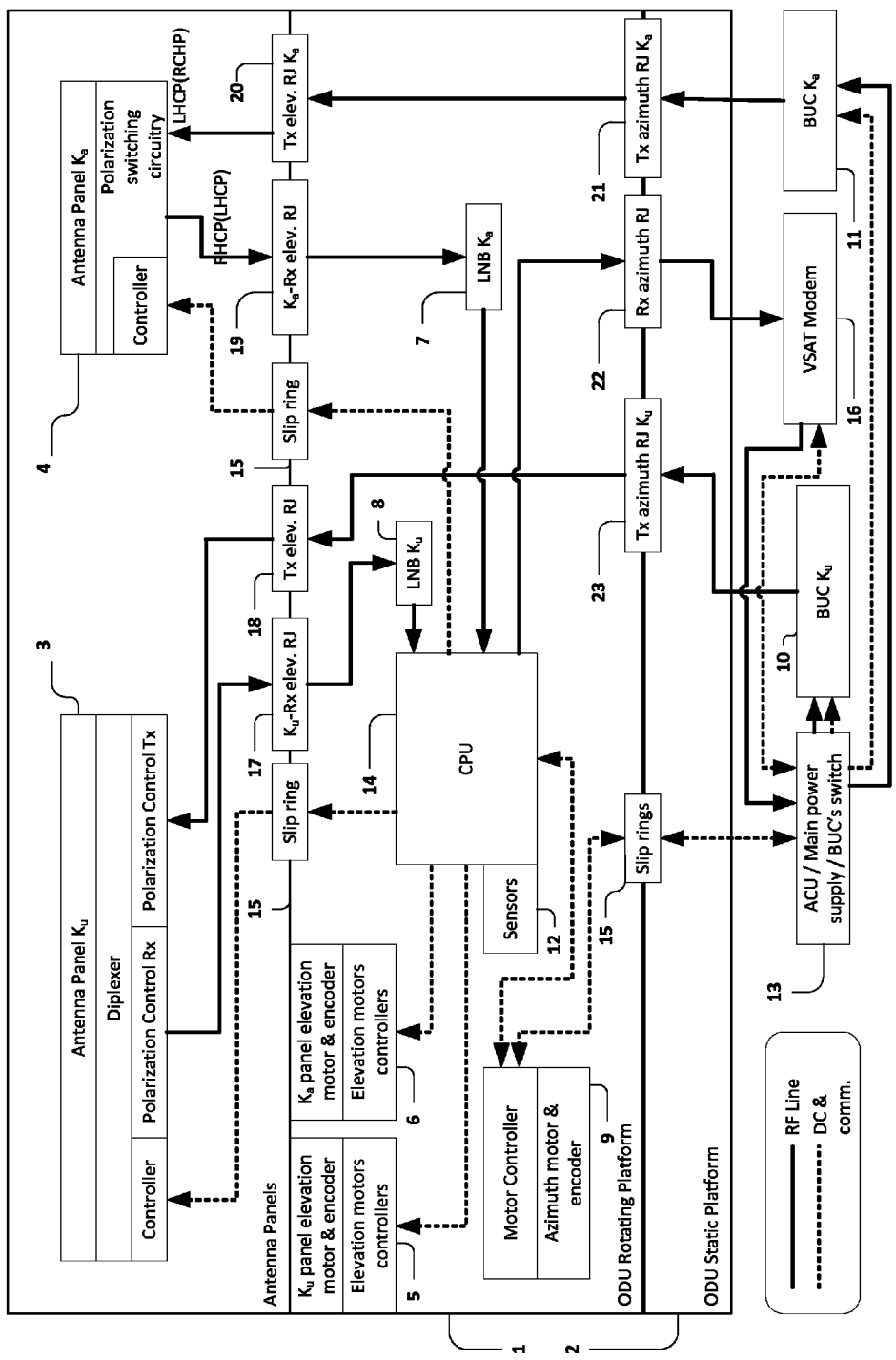
FIG. 3 is a block diagram of an illustrative mobile antenna terminal in accordance with one or more aspects of the disclosure.

FIG. 3 depicts an illustrative antenna terminal (outdoor unit) in accordance with one or more aspects. With the reference to FIG. 3, parts of the antenna terminal may be mounted on static platform 2 or rotating platform 1 platforms. On rotating platform 1, at least two antenna panels (e.g., flat array antennas) may be mounted. For example, antenna panel 3 may be operative in Ku frequency range and/or antenna panel 4 may be operative in Ka frequency range. In some embodiments, both panels 3 and 4 may be operative in transmit and receive modes and may comprise any of an embedded diplexer and polarization control circuitry. Polarization switching and control circuitry may be controlled by central processing unit (CPU) 14 by slip ring transitions 15. RF signals may be transferred between panels 3 and 4, and RF electronics, installed on the rotary platform 1, using waveguide elevation rotary joints in order to achieve lower losses and higher reliability. In some embodiments, RF signals may be transferred to antenna panel 3, operative in Ku frequency range, by elevation waveguide rotary joints 17 and 18. For example, rotary joint 17 may be operative in Ku transmit frequency band and rotary joint 18 may be operative in Ku receive frequency band. In some embodiments, RF signals may be transferred to antenna panel 4, operative in Ka frequency range, by waveguide rotary joints 19 and 20. For example, rotary joint 20 may be operative in Ka transmit frequency band and rotary joint 19 may be operative in Ka receive frequency band. In some embodiments, the receive signals may be transferred to LNBs (Low Noise Blocks) 8 and 7. For example, LNB 8 may be operative in Ku receive frequency band and LNB 7 in Ka receive frequency band. Both LNBs may be controlled by the central processor, and may output IF (Intermediate Frequency) signals in L band to be transferred by azimuthal rotary joint 22 to static platform 2, and then to VSAT modem 16.

The transmit signals may be delivered by block up convertors (BUCs) 10 and 11. For example, BUC 10 may generate signals in the Ku transmit frequency range, while BUC 11 may generate signals in the Ka transmit frequency band. The signals may be transferred to static platform 2 by azimuthal waveguide rotary joints 23 and 21. For example, rotary joint 23 may be operative in Ku transmit frequency band, while rotary joint 21 may be operative in Ka transmit frequency band.

In some embodiments, antenna panels 3 and 4 may be pointed toward a particular satellite in azimuthal plane by azimuthal motor 9, which may comprise an embedded motor controller, controlled by CPU 14. In some embodiments, each of the panels 3 and 4 may be pointed toward the particular satellite in elevation plane using a separate motor. For example, elevation motor 5 may be operative for elevation-plane pointing of the Ku-frequency-range antenna panel 3, while motor 6 may be operative for elevation-plane pointing of the Ka-frequency-range panel 4.

In some embodiments, the satellite acquisition and tracking system may comprise sensor block 12. Sensor block 12 may comprise gyroscopic sensors, an integrated digital receiver, and/or a differential GPS receiver in order to deliver information to CPU 14 for satellite acquisition, reacquisition, and/or tracking.

In some embodiments, Ku-frequency-range panel 3 may comprise an antenna array of radiating square apertures (e.g., open-ended waveguide radiating elements having strip-line feeds) operative for horizontal and vertical, linearly polarized signals. With reference to FIG. 4a, in some embodiments, an antenna array element may comprise a grid layer 302, forming a square-radiating aperture 301, that may be fed by a triple transformer 303, wherein the transformer 303 may comprise quad-ridged waveguide sections for at least the purpose of achieving good matching over both transmit and receive Ku frequency bands. The antenna element horizontal-polarization port may be operational in a first fundamental mode and may be fed by differential probes 304. The antenna element vertical-polarization port may be operational in a second fundamental mode, and may be fed by differential probe 305. The differential excitation (stimulation) of the quad-ridged waveguide sections 303 may provide good performance (e.g., low loss and good matching) of the open-ended waveguide radiating elements over the entire operative frequency range, e.g., due to effectively suppressing undesired high-order electromagnetic modes.

Stimulation of the two fundamental modes may be accomplished by two sets of orthogonally oriented differential probes 304 and 305 which may be placed on different levels, e.g., one above the other as depicted in FIG. 4a. The first fundamental mode may be excited by the first set of differential probes 304 in the quad-ridged waveguide 303, which may be placed on a first level. A back-short for the first fundamental mode may be provided by a double-ridged waveguide section 320, which may be connected between the first and second levels of the probes. The second fundamental mode may be stimulated through the second set of differential probes 305, which may excite the double-ridged waveguide section 320. A square waveguide section 330 beneath the double-ridged waveguide section 320 may be configured to provide a back-short for the second fundamental mode. FIG. 4b depicts an illustrative horizontal-port differential probe construction. The construction may comprise two differential suspended strip line probes 306 loaded by a capacitance 308 and parasitic coupled stub 307 for perfect matching through entire operating frequency range. FIG. 4c depicts an illustrative vertical port differential probe construction. The construction may comprise two differentially fed probes 308 matched by capacitance 311, ring line 310 and a parasitically coupled stub 309.

In some embodiments, antenna element horizontal and vertical ports are combined by two independent combining circuits and fed to the two independent antenna outputs allowing for the application of polarization control. Each one of these two independent combining circuits may comprise two stages of combining (e.g., initial combining by a suspended strip line combining circuit, and a final waveguide base combining circuit). This two-stage construction of the antenna combining circuits may significantly reduce the complexity and/or final thickness of the antenna panel, keep losses relatively low, and/or ensure high antenna efficiency.

FIG. 6a and FIG. 6b depict illustrative configurations of initial combing circuits in accordance with one or more embodiments. The combing circuit for horizontal ports 600a is illustrated by FIG. 6a while the combing circuit for vertical ports 600b is illustrated by FIG. 6b. Both combing circuits comprise four-to-one combing circuits that are then combined by T junction combiners. For example, combing circuit 600a comprises suspended strip line T junction 601 to combine four-to-one combing circuits and suspended-strip-line-to-waveguide transitions 603. The second combing circuit, for vertical ports combining, may similarly comprise suspended strip line T junctions 602 and suspended-strip-line-to-waveguide transitions 604.

FIGS. 5a and 5b depict illustrative four-to-one combing circuits for combining antenna elements horizontal and vertical polarization ports. Four-to-one combing circuit 400 for horizontal ports is illustrated by FIG. 5a. The differential ports of the four antenna array elements are fed by four rat-race-suspended strip-line couplers 401, while the final summation is made by another rat-race coupler 402, and then the summed signal is fed to combining-circuit output 403.

FIG. 5b depicts an illustrative four-to-one combing circuit for vertical antenna elements. Combing circuit 500 comprises four suspended-strip-line rat-race couplers 501 and a final rat-race coupler 502. Then the signal is transferred to the vertical-polarization port-combiner output 503.

Figure 7:
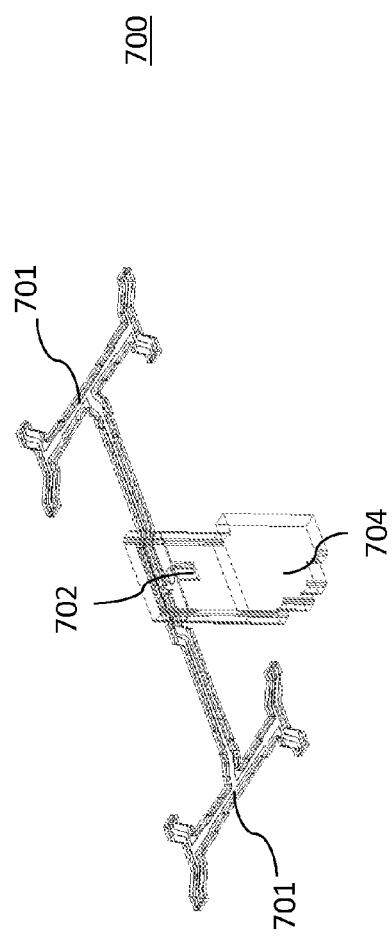
FIG. 7 depicts an illustrative suspended strip line to waveguide transition in accordance with one or more aspects of the disclosure.

FIG. 7 depicts an illustrative configuration of T junction combiners 701 and suspended-strip-line-to-waveguide transitions 702. A step waveguide impedance transformer 704 may be used for better matching.

Figure 8:
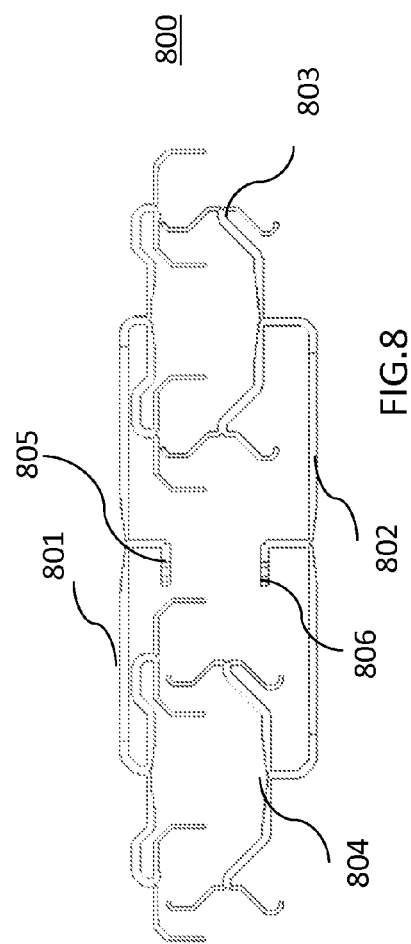
FIG. 8 depicts an illustrative final antenna panel waveguide combiner in accordance with one or more aspects of the disclosure.

FIG. 8 depicts an illustrative configuration of final waveguide based combiner 800. Final waveguide combiners for horizontal antenna ports 805 and for vertical antenna ports 802 comprise waveguide T junction 803 and waveguide impedance step transformers 804. The summed signal is transferred to the horizontal antenna port 805 and correspondently to vertical antenna port 806.

Figure 9:
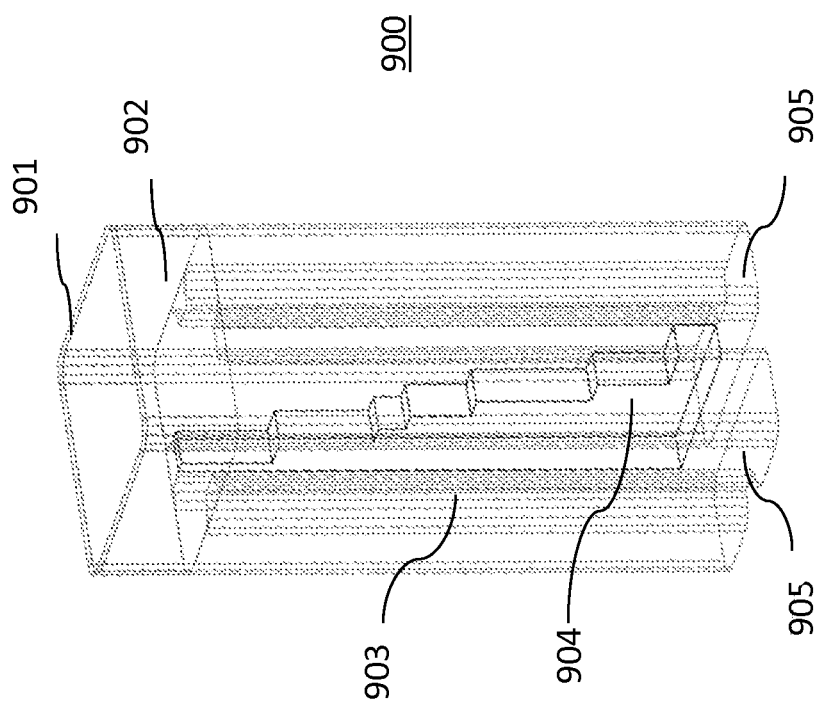
FIG. 9 depicts an illustrative dual-band-range antenna array element for use in a Ka frequency range operative panel in accordance with one or more aspects of the disclosure.

With reference to FIG. 9, in some embodiments, dual-band antenna element 900 may be used to build a Ka-frequency-range operative panel. Antenna element 900 comprises dielectric thin cap 901, radiating aperture grid 902, square quad-ridged (open ended) waveguide 903 and septum 904. In some embodiments, the square quad-ridged (open ended) waveguides may be spaced in less than one wavelength from each other. A square quad-ridged (open ended) waveguide 903 is used for at least the purpose of supporting dual band operation in Ka frequency range. For example, the first band may be 19 to 21 GHz and the second may be 29 to 31 GHz. The above-mentioned square quad-ridged (open ended) waveguide in combination with the septum 904 may form a polarization-forming device, forming circularly polarized signals with RH (right hand) and LH (left hand) polarization fed to two rectangular waveguide outputs 905. The antenna elements outputs may be summed by to independent waveguide-combining networks.

In some embodiments, a system for satellite acquisition and tracking may comprise a combination of open loop and close loop tracking systems in order to achieve better accuracy at lower cost. The open loop system may be used for fast platform movement compensation, while the close loop system, may comprise a Receive Signal Strength Indicator (RSSI), which may be used for satellite acquisition and reacquisition and/or for open loop sensors drift compensation.

Figure 10:
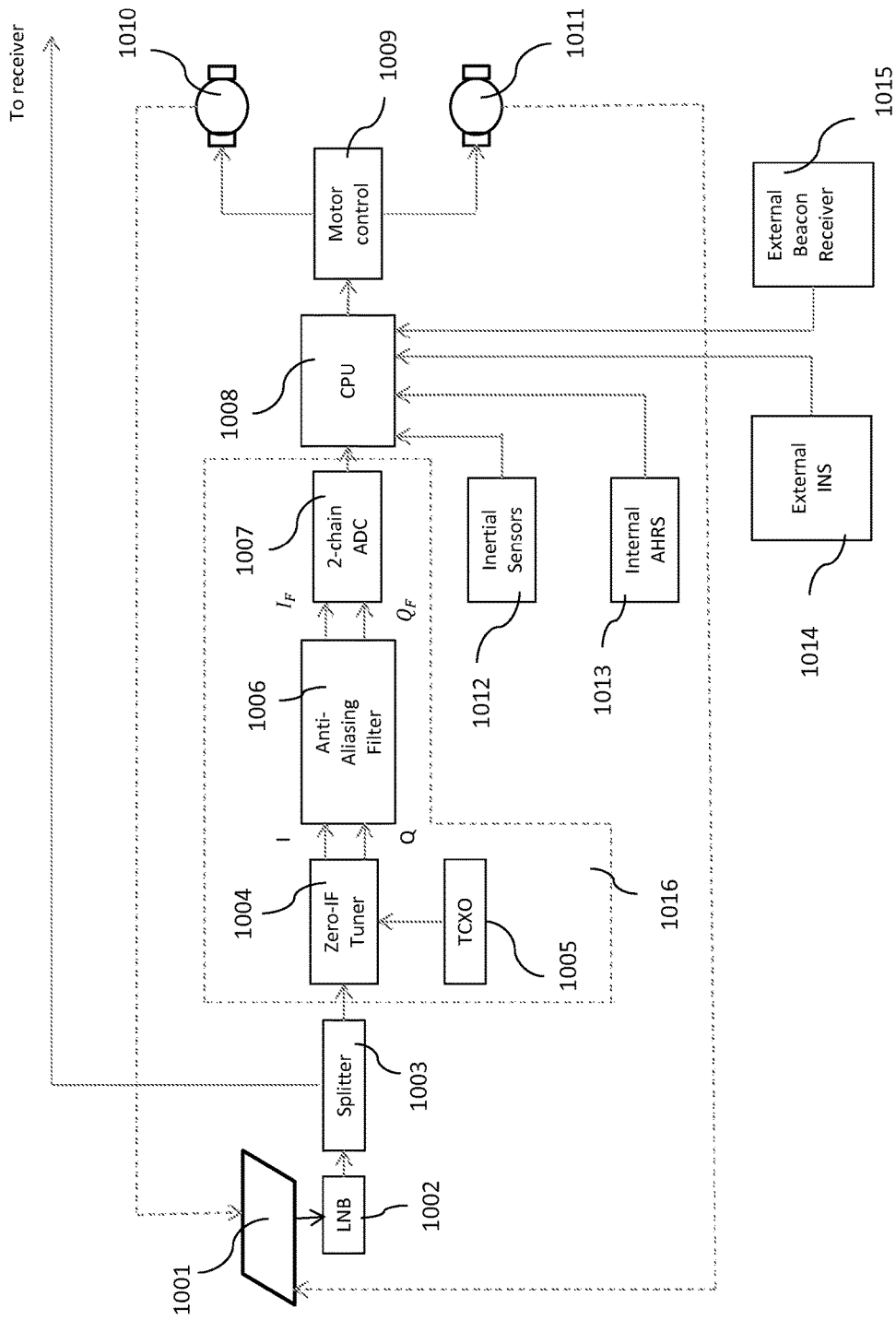
FIG. 10 is a block diagram depicting an illustrative satellite tracking and acquisition system in accordance with one or more aspects of the disclosure.

FIG. 10 depicts an illustrative antenna terminal acquisition and tracking system. The signal received by antenna panel 1001 may be down-converted by a Low Noise Block (LNB), divided by splitter 1003 and transferred to the receiver and to multi-mode signal detector 1016. Multi-mode signal detector 1016 may have an adjustable frequency band of operation and may be used as a beacon receiver in the process of the satellite acquisition and as an RSSI detector in the process of the satellite tracking. In some embodiments, the multi-mode signal detector may comprise zero-IF tuner 1004, temperature stabilized oscillator (TCXO) 1005, anti-aliasing filter 1006 and two-chained Analog-to-Digital Converters (ADCs) 1007. Information regarding the signal strength may be transferred to CPU 1008. CPU 1008 may process this information in parallel to the information received by internal Attitude Heading Reference System (AHRS) 1013 in the process of satellite acquisition and reacquisition or in parallel to the information received by inertial sensors 1012 in the process of the satellite tracking. The calculated information about the antenna beam position may then be transferred to the motor controller 1009, which may drive azimuth motor 1010 and/or elevation motors 1011 in order to point the beam of antenna panel 1001 toward a particular satellite. Additionally or alternatively, information from external Inertial Navigation System (INS) 1014 and/or external beacon receiver 1015 may be utilized.

Figure 11:
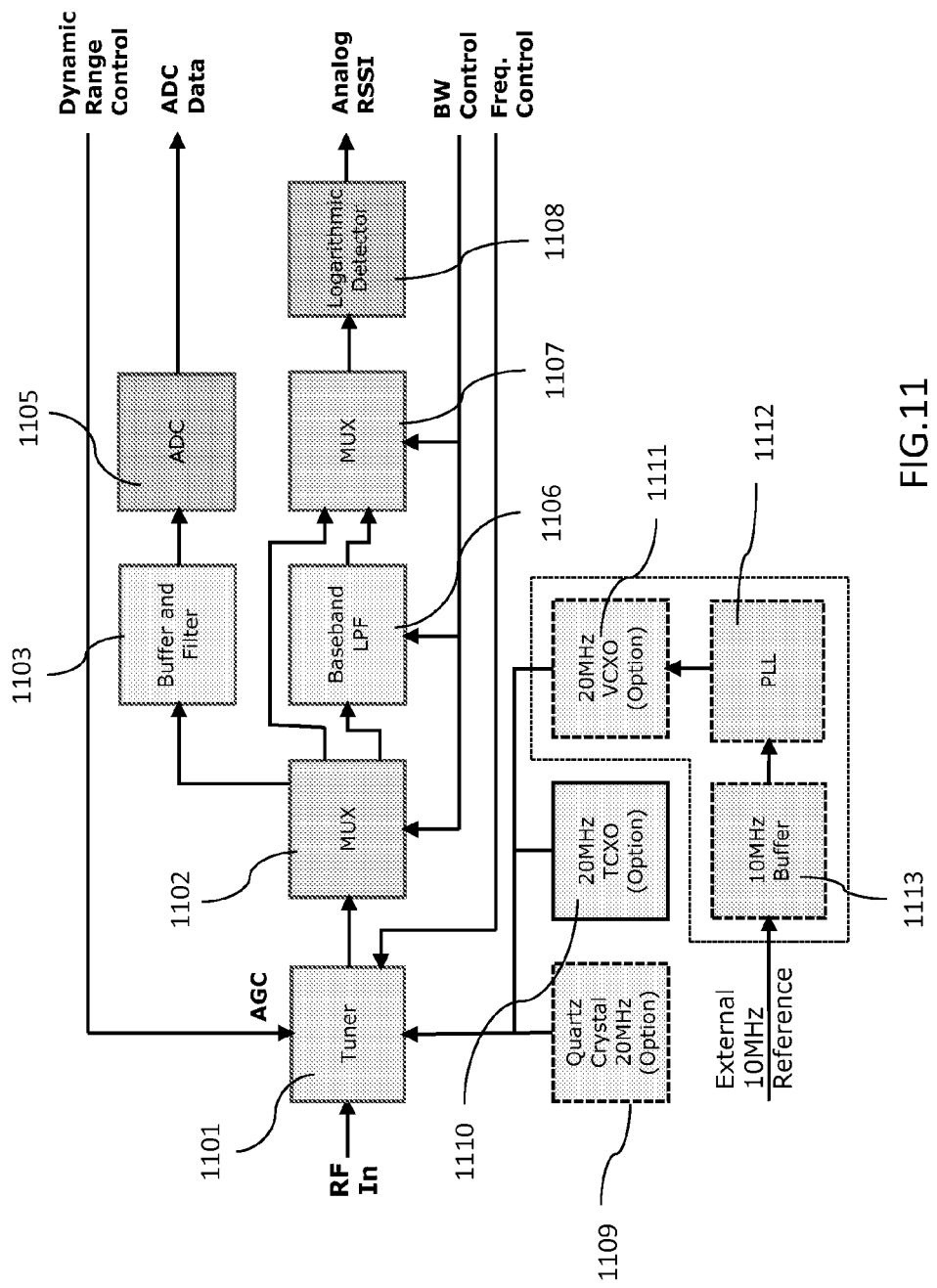
FIG. 11 is a block diagram depicting an illustrative multi-mode signal detector in accordance with one or more aspects of the disclosure.

The configuration and the operation of multi-mode signal detector 1016 are described in further detail with reference to FIG. 11. The detector may be configured to measure RF signal strength in a bandwidth varying from as low as 1000 Hz to as high as tens of MHz centered on a certain frequency of interest (e.g., $f_0$). In some embodiments, the RF signal is down converted to the base band by tuner 1101 and switched by multiplexers 1102 and 1107 to one of the following devices:

Directly to the input of the logarithmic detector 1108 in order to provide signal detection over the entire base band bandwidth (for example from several MHz to tens of MHz);

Passed to the input of a programmable baseband low-pass filter 1106 and then to the input of the logarithmic detector 1108 in order to vary the signal detection bandwidth from tens KHz to several MHz; or Passed through buffer and antialiasing filter 1103 to the input of an analog to digital converter ADC 1105, and then processed by the CPU or Digital Signal Processor (DSP).

Figure 12:
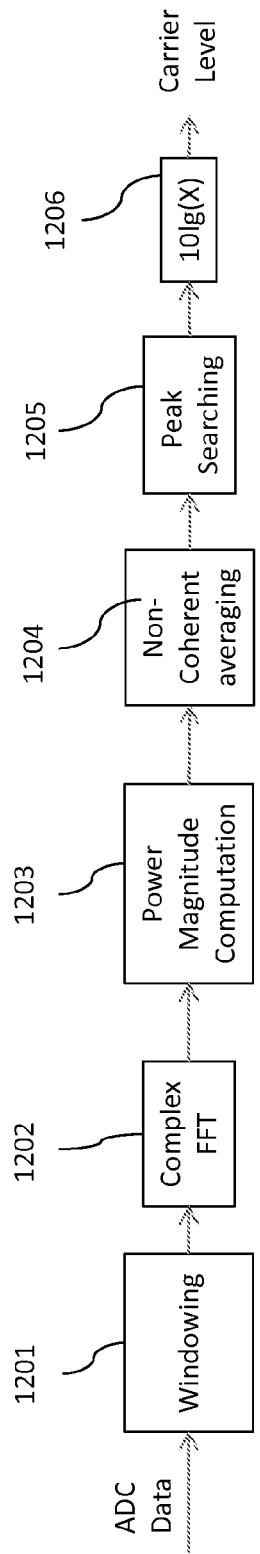
FIG. 12 depicts illustrative data processing of digital data provided by a multi-mode signal detector in accordance with one or more aspects of the disclosure.

FIG. 12 depicts illustrative data processing in accordance with the third option, and may comprise the processes of widowing 1201 of the sampling data in order to minimize the effect of spectral leakage during the next processing, Fast Fourier Transformation (FFT) 1202 in order to compute the signal spectrum, power magnitude computation 1203, optional non coherent averaging 1204, peak searching 1205, and converting of the power level in logarithmic units 1206.

In some embodiments, particular methods of satellite acquisition are utilized in order to significantly reduce acquisition and reacquisition time. Since the uncertainty in the satellite beacon frequency is typically bigger than the allowable offset of communication transponder frequency, the searching may be done in overlapping frequency intervals by changing the tuner frequency. From another side the beacon frequencies are not unique and may be reused over several satellites in the sky and in that case the beacon signals cannot identify that the required satellite is acquired. In this case additional satellite verification may be done using an Attitude Heading Reference System (AHRS). Unfortunately, available AHRSs are not capable of providing the required accuracy sufficient for open loop "blind" pointing of the antenna. In order to solve this problem, in some embodiments, a combination of an attitude heading reference system and multi-mode signal detector (e.g., working in a narrow band mode as beacon receiver) may be utilized.

Figure 13:
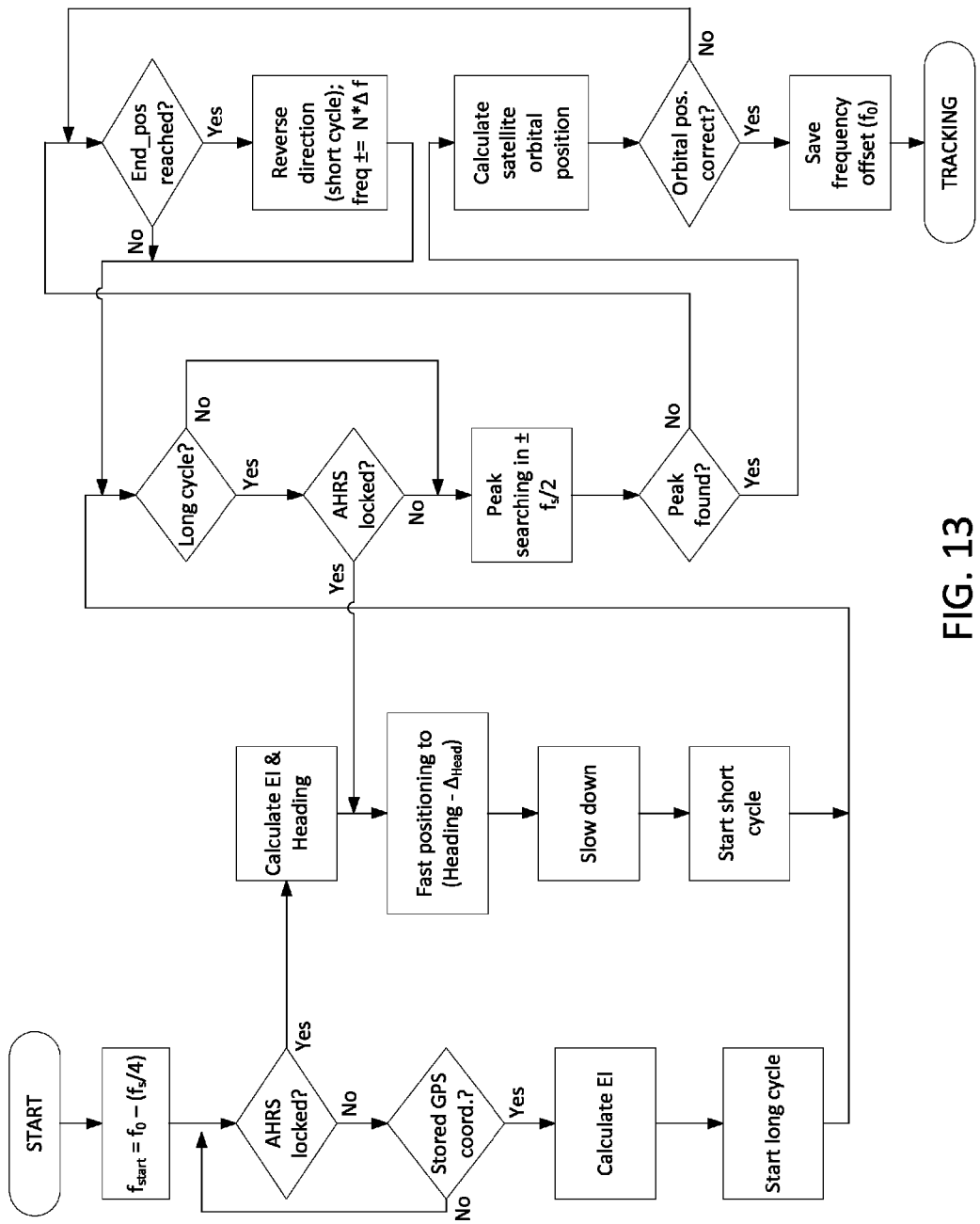
FIG. 13 depicts an illustrative satellite-acquisition algorithm in accordance with one or more aspects of the disclosure.

FIG. 13 depicts an illustrative satellite acquisition algorithm. Referring to FIG. 13, the depicted satellite searching algorithm may be described as follows:

The tuner is set initially on $f_r=f_{start}=f_0-(f_s/4)$, where $f_0$ is the last known beacon frequency, $f_r$ is the tuner frequency, and $f_s$ is a sampling frequency of the ADC. For initial antenna usage this may be the nominal beacon frequency according to the satellite datasheet. Once the antenna acquires the satellite, $f_0$ may be replaced by the actual found frequency. In this way, the expected frequency of the beacon may be centered in one of the continuous FFT sub-bands.

The AHRS may require some interval after the power up for cold start (typically 60 seconds). Before AHRS is locked, the last known GPS coordinates may be used to calculate the expected satellite elevation. The orientation of the antenna referenced to true North may be unknown, and the searching may be started over the whole azimuth range of 360° (long cycle). After each FFT processing a peak in the spectrum may be searched in the ranges $[-f_s/2, f_s/2]$ centered on the tuner frequency $f_r$.

When the cold-start interval of the AHRS has passed, the AHRS may provide the orientation of the antenna referenced to true North, wherein the provided orientation may include some uncertainty ($\Delta_{Head}$). The antenna CPU 1008 may be configured to perform a coordinate transformation from the Earth Centered East Down (ECEF) coordinate system to the antenna coordinate system, and may calculate the expected satellite heading and elevation. CPU 1008 may then control a movement of the antenna, e.g. movement at a maximal velocity, to (Heading−$\Delta_{Head}$) coordinate. The search for the satellite may then be limited in the azimuth range [Heading−$\Delta_{Head}$, Heading+$\Delta_{Head}$] (short cycle). If a long or short cycle is finished without finding a peak, the tuner frequency may be changed by $\Delta f$ and a new cycle may be started. In the case of a short cycle, the motion direction may be reversed, so the searching may be done only in the azimuth range [Heading−$\Delta_{Head}$, Heading+$\Delta_{Head}$].

When a peak is found, a backward coordinate transformation may be performed from the antenna coordinate system to the ECEF system to calculate the orbital position of the received satellite from the actual azimuth, elevation, and antenna platform inclination. If the calculated orbital position matches the expected value within a predefined uncertainty range, then the detected beacon frequency may be stored in a non-volatile memory to be used the next time the antenna is powered up. If the orbital position does not match, then the searching cycle may be restarted.

In some embodiments, two possible methods of satellite tracking may be applicable:

Close loop tracking—using information from the inertial system sensors and from RSSI detector; and Open loop tracking—using an external high accuracy inertial navigation system.

Figure 14:
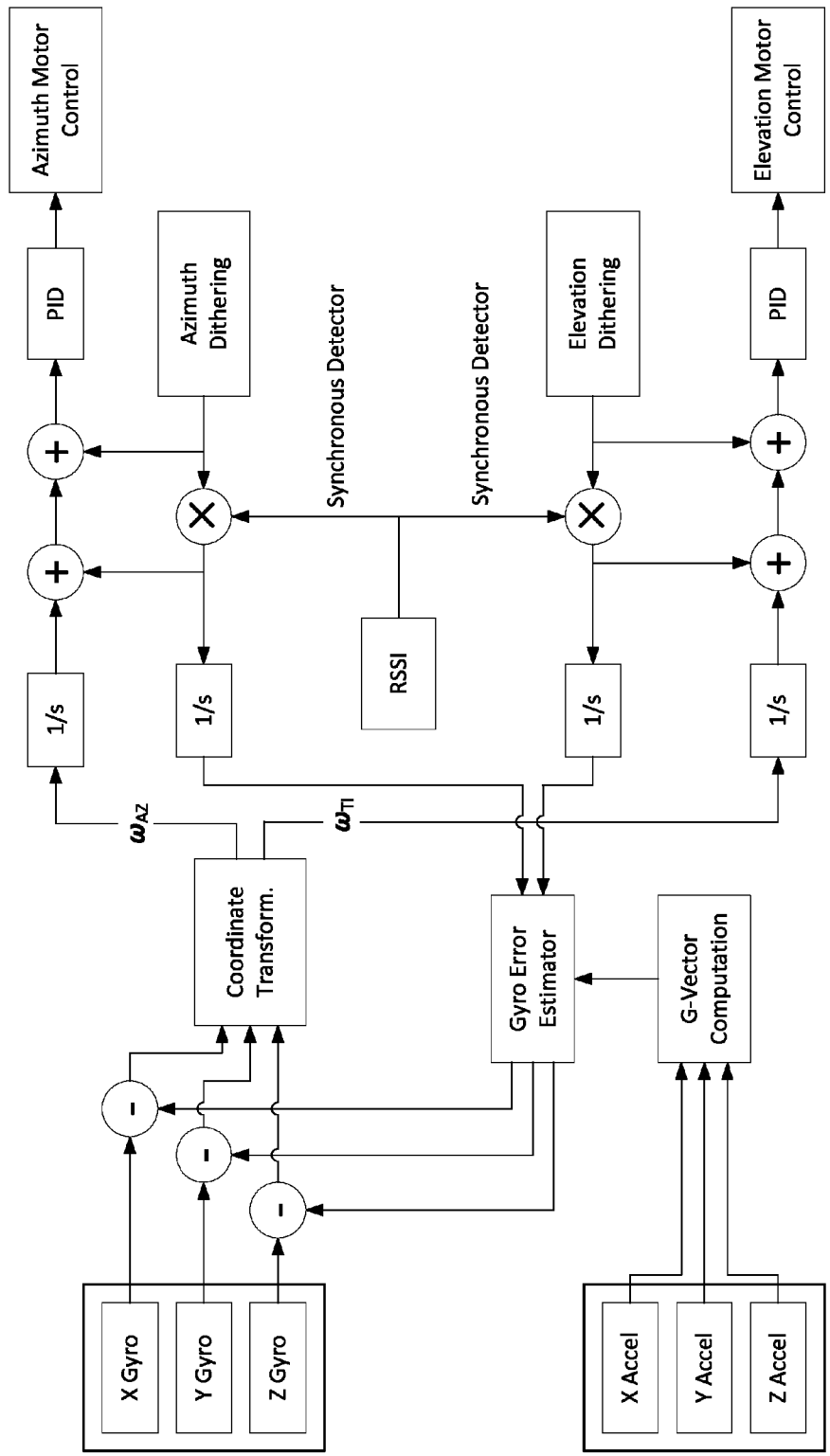
FIG. 14 depicts an illustrative satellite-tracking algorithm in accordance with one or more aspects of the disclosure.
Figure 15:
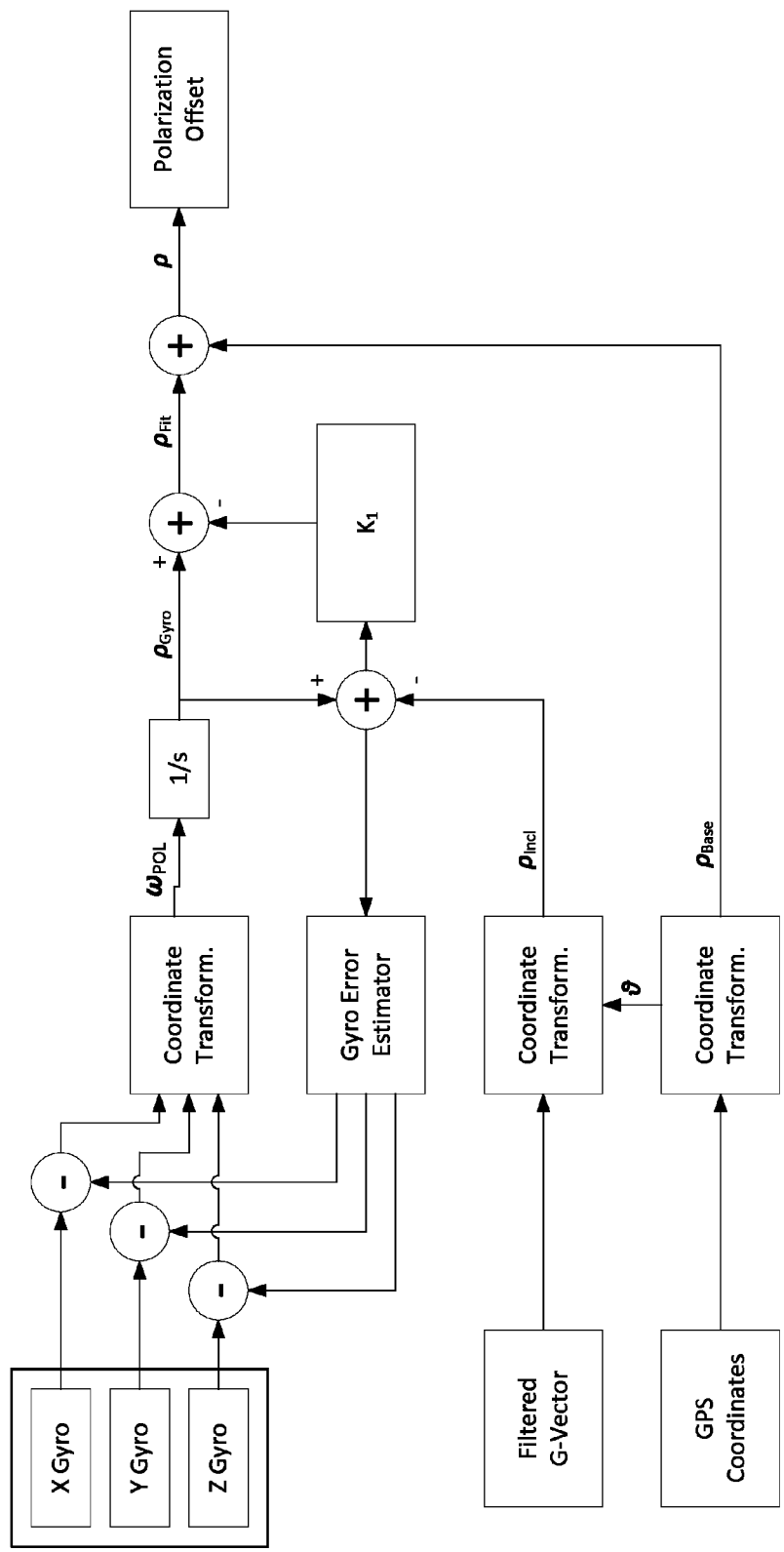
FIG. 15 depicts an illustrative polarization-tracking algorithm in accordance with one or more aspects of the disclosure.

FIG. 14 depicts an illustrative algorithm for close loop satellite tracking and FIG. 15 depicts an illustrative algorithm for polarization tracking. Referring to FIGS. 14 and 15, the tracking method may be described as follows:

The satellite tracking may be started after the satellite is found by the satellite acquisition process. A coordinate transformation may be performed to produce azimuth and elevation angular velocities from the signals of 3 gyros aligned with the axes of the antenna coordinate system. The angular velocities may then be integrated to obtain the azimuth and elevation angles of the disturbances in the antenna orientation. The PID loops for azimuth and elevation may be used to control the motors in a way to cancel the measured disturbances.

The azimuth and elevation angles may be moved (dithered) by orthogonal functions with small amplitudes (sine-cosine) and the signal detector level (RSSI) may be measured synchronously with the motion. The integrated asymmetry in the detected signal may be used to compensate the antenna orientation in a way to cancel this asymmetry and for estimation of gyroscope drift.

As azimuth and elevation channels provide only two degrees of freedom for gyroscope compensation, additional error estimation may be performed from the orientation of the gravity vector measured by the 3-axis accelerometer.

In some embodiments, open loop tracking using a high accuracy external inertial navigation system (INS) for providing direct pointing to the satellite is utilized. The calculations in this case may use the requested satellite orbital position by the user, the INS data (e.g., roll, pitch, yaw angles and velocities) and antenna geographic location data provided by the integrated GPS.

The satellite coordinates may first be calculated in the Earth Centered East Forward (ECEF) coordinate system. Then a transformation may be performed from ECEF to the North East Down (NED) coordinate system located in the geographic position of the antenna. The next transformation may calculate the satellite coordinates in the frame of the INS coordinate system. Finally, a calculation may be performed for the satellite coordinates in the antenna coordinate system.

The calculated azimuth, elevation, and polarization may provide commands to the antenna motors and electronic circuits to align the antenna beam to the satellite.

Figure 16:
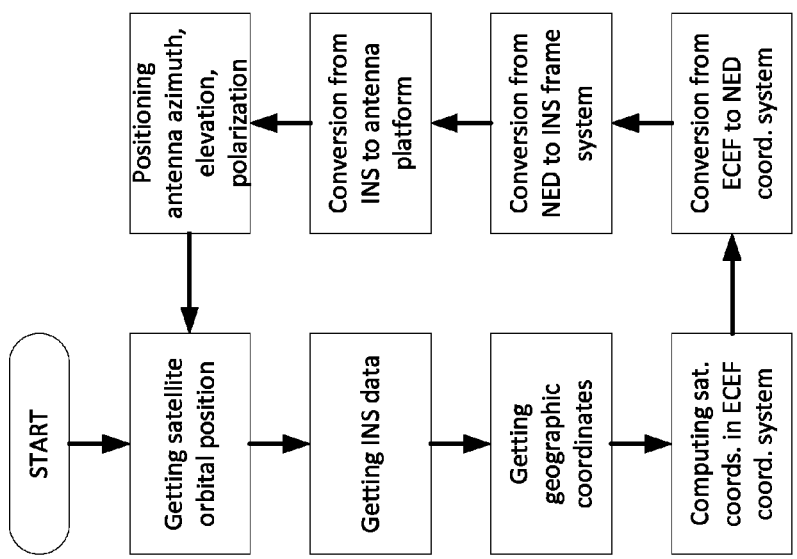
FIG. 16 depicts an illustrative coordinates-transferring algorithm in accordance with one or more aspects of the disclosure.

FIG. 16 depicts an illustrative coordinate transformation algorithm.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples, and may be rearranged, combined, subdivided, omitted, and/or altered in any desired manner. For example, features of the servers may be subdivided among multiple processors and/or computing devices. The true scope of this patent should only be defined by the claims that follow.

What is claimed is:

1. An apparatus, comprising:
   a rotating platform comprising a first antenna panel and a second antenna panel, wherein the first antenna panel is configured for transmitting and receiving in a first frequency band, and wherein the second antenna panel is configured for transmitting and receiving in a second frequency band;
   a control system comprising one or more sensors and at least one processor;
   a tuner configured to receive a signal via at least one of the first antenna panel or the second antenna panel;

a filter coupled to an output of the tuner and configured to provide a filtered signal; and a converter coupled to an output of the filter and configured to provide samples of the filtered signal to the at least one processor, wherein the at least one processor is configured to control movement of the rotating platform using information received from the one or more sensors and to use the tuner, the filter, and the converter to detect a first signal.

2. The apparatus of claim 1, wherein the at least one processor is further configured to:

calculate a Fast Fourier Transform (FFT) using samples of the filtered signal;

calculate a signal power magnitude for each bin of the FFT; and identify a bin of the FFT that corresponds to a maximum signal power magnitude.

3. The apparatus of claim 1, wherein the tuner is a zero intermediate-frequency (IF) tuner and the at least one processor is configured to search, in parallel, for a satellite carrier signal in frequency range $[-f_s/2, f_s/2]$ symmetrically located around zero IF tuner frequency ($f_t$), wherein $f_s$ represents a sampling frequency of the converter.

4. The apparatus of claim 1, wherein the at least one processor is configured to search for a satellite beacon frequency using one or more azimuth searching cycles, and is further configured to overcome a frequency uncertainty larger than $f_s/2$ in the satellite beacon frequency by shifting the zero IF tuner frequency ($f_t$) after each azimuth searching cycle.

5. The apparatus of claim 4, wherein the at least one processor is configured to identify a satellite using a combination of a determined satellite beacon frequency and a satellite heading relative to North.

6. The apparatus of claim 1, wherein the first frequency band is a Ku frequency band.

7. The apparatus of claim 1, wherein the second frequency band is a Ka frequency band.

8. The apparatus of claim 1, wherein at least one of the first antenna panel or the second antenna panel comprise one or more plastic materials and a conductive coating.

9. An apparatus, comprising:

a rotating platform comprising a first antenna panel and a second antenna panel, wherein the first antenna panel is configured for transmitting and receiving in a first frequency band, and wherein the second antenna panel is configured for transmitting and receiving in a second frequency band;

a baseband low-pass filter;

a logarithmic detector; and a control system comprising one or more sensors and at least one processor, wherein the at least one processor is configured to control movement of the rotating platform using information received from the one or more sensors and to use the baseband low-pass filter and the logarithmic detector to detect a first signal.

10. The apparatus of claim 9, further comprising a switch configured to allow the baseband low-pass filter to be bypassed, wherein the at least one processor is configured to utilize the switch to bypass the baseband low-pass filter to detect a second signal.

11. The apparatus of claim 9, wherein the first frequency band is a Ku frequency band.

12. The apparatus of claim 9, wherein the second frequency band is a Ka frequency band.

13. The apparatus of claim 9, wherein at least one of the first antenna panel or the second antenna panel comprise one or more plastic materials and a conductive coating.

14. An apparatus, comprising:

a rotating platform comprising a first antenna panel and a second antenna panel, wherein the first antenna panel is configured for transmitting and receiving in a first frequency band, and wherein the second antenna panel is configured for transmitting and receiving in a second frequency band;

a reference system configured to indicate an antenna heading; and a control system comprising one or more sensors and at least one processor, wherein the at least one processor is configured to:

control movement of the rotating platform using information received from the one or more sensors;

perform at least one azimuth search cycle using a first range of azimuth values for finding a satellite if the reference system is not locked; and perform at least one azimuth search cycle using a second range of azimuth values for finding the satellite if the reference system is locked, wherein the second range of azimuth values is a subset of the first range of azimuth values.

15. The apparatus of claim 14, wherein the at least one processor is configured to identify a satellite using a combination of a determined satellite beacon frequency and a satellite heading relative to North.

16. The apparatus of claim 14, wherein the at least one processor is configured to:

convert satellite coordinates to earth centered earth fixed (ECEF) coordinates; and convert ECEF coordinates to coordinates corresponding to the rotating platform and to at least one of the first antenna panel or the second antenna panel.

17. The apparatus of claim 14, wherein the first frequency band is a Ku frequency band.

18. The apparatus of claim 14, wherein the second frequency band is a Ka frequency band.

19. The apparatus of claim 14, wherein at least one of the first antenna panel or the second antenna panel comprise one or more plastic materials and a conductive coating.

20. The apparatus of claim 14, wherein the at least one processor is configured to use information received from any of an external inertial navigation system (INS) and a global positioning system (GPS) receiver for pointing at least one of the first antenna panel and the second antenna panel towards a satellite.

* * * * *